US006688513B2

(12) United States Patent
Porcher et al.

(10) Patent No.: US 6,688,513 B2

(45) Date of Patent: Feb. 10, 2004

(54) PROCESS FOR PRODUCING LONGITUDINALLY WELDED TUBES

(75) Inventors: Klaus Porcher, Lehrte (DE); Friedrich Harten, Stadthagen (DE)

(73) Assignee: Nexans, Paris (FR)

( * ) Notice: Subject to any disclaimer, the term of this patent is extended or adjusted under 35 U.S.C. 154(b) by 49 days.

(21) Appl. No.: 09/880,050

(22) Filed: Jun. 14, 2001

(65) Prior Publication Data

US 2002/0125302 A1 Sep. 12, 2002

(30) Foreign Application Priority Data

Oct. 20, 2000 (DE) ........................................ 100 51 962
Feb. 10, 2001 (DE) ........................................ 101 06 195

(51) Int. Cl.$^{7}$ ........................ B23K 31/02; B23K 31/00; B23K 37/00; B21D 39/00

(52) U.S. Cl. ................................ 228/173.1; 228/173.4; 228/147; 228/150; 228/153; 228/164; 228/166; 228/17.5

(58) Field of Search ........................... 228/173.7, 173.1, 228/17.5, 219, 147, 149–156, 164–166; 219/61.11, 61.2, 61.3

(56) References Cited

U.S. PATENT DOCUMENTS 3,001,569 A * 9/1961 Gradt .......................... 153/52
3,023,300 A * 2/1962 Lehnert ....................... 219/60
3,648,008 A * 3/1972 Kawato et al. ............. 219/104
3,794,803 A * 2/1974 Valdeck ...................... 228/148
4,335,494 A * 6/1982 Lemelson ...................... 419/3
4,508,949 A * 4/1985 Rudd ...................... 219/61.11
4,578,985 A * 4/1986 Winter ........................ 72/274
4,783,981 A 11/1988 Shahum
4,971,239 A * 11/1990 Tyler et al. ................ 219/61.3
4,995,549 A * 2/1991 Hellman, Sr. ................ 72/176
5,121,872 A * 6/1992 Legget ....................... 228/148
5,143,274 A * 9/1992 Laupretre et al. ........... 228/102
5,511,440 A * 4/1996 Watanabe et al. ............. 74/492
5,560,536 A * 10/1996 Moe .......................... 228/102
5,784,911 A * 7/1998 Hashimoto et al. ........... 72/176

FOREIGN PATENT DOCUMENTS

DE 2352573 A2 4/1975
DE 2805735 C3 8/1979
DE 3044003 C2 6/1982
DE 4434134 A1 3/1996
JP 58-70984 A * 4/1983

* cited by examiner

*Primary Examiner*—Tom Dunn
*Assistant Examiner*—Lynne Edmondson
(74) *Attorney, Agent, or Firm*—Sughrue Mion, PLLC

(57) ABSTRACT

In a process for producing longitudinally welded tubes, a metal strip, which is continuously pulled from a supply, is gradually formed into a slit tube and the longitudinal slit of said slit tube is welded. The metal strip (2) is pulled through a plurality of drawing dies (8, 9, 10, 11) arranged one behind the other and having a diameter that decreases in production direction, and in each of the drawing dies (8, 9, 10, 11) is increasingly bent in circumferential direction. The slit tube is closed in a last forming step (15) immediately in front of the welding point.

15 Claims, 2 Drawing Sheets

PROCESS FOR PRODUCING LONGITUDINALLY WELDED TUBES

BACKGROUND OF THE INVENTION

U.S. Pat. No. 3,023,300 A discloses a process for producing longitudinally welded metal tubes in which a metal strip pulled from a supply reel is shaped into a slit tube in a continuous process using a shaping apparatus that consists of a plurality of shaping roller pairs arranged one behind the other. The strip edges of the slit tube are welded together, the welded metal tube is provided with a helical or annular corrugation, and the corrugated tube is wound onto a supply drum.

Such a process, which is particularly suited for sheathing the cores of electrical cables, makes it possible to produce metal tubes in great lengths.

DE 44 34 134 A1 describes a similar process for producing metal tubes with an outside diameter of between 1 and 6 mm. In this process, too, a metal strip that is continuously pulled from a supply is shaped into a slit tube and the strip edges are welded together. The shaping apparatus also consists of a plurality of shaping roller sets.

A pull-off device with clamping jaws firmly gripping the slit tube precisely guides the slit tube underneath the welding apparatus. Behind the clamping jaw pull-off device, the slit tube runs into a guide unit, which precisely guides the tube in front of and behind the welding point. An opening in the guide unit unblocks the strip edges in a short area, so that a laser beam can weld the edges together.

This process is particularly suitable for producing small tubes made of stainless steel with dimensions of about 3–3.5 mm and a wall thickness of 0.2 mm.

The drawback is that the shaping of the metal strip into a slit tube is limited to a wall thickness of at least 0.15 mm. If the walls are thinner, a precise mutual alignment of the strip edges is no longer possible. However, to obtain a proper weld seam in extremely thin wall thicknesses, it is essential that the strip edges meet exactly. This is true, in particular, if the strip edges are welded by means of a laser welding device.

SUMMARY OF THE INVENTION

Thus, the object of the present invention is to improve the initially described process to make it possible to produce tubes with an outside diameter of less than 6 mm from a metal strip with a wall thickness of less than 0.15 mm, particularly less than 0.10 mm.

The features according to the invention offer a surprisingly simple method to produce a flawless metal tube with a very thin wall thickness without requiring any subsequent drawing processes.

It is assumed that the increased friction between the drawing dies and the bent metal strip prevents "migration" of the bent metal strip or the slit tube. Particularly if a diamond material is used for the drawing dies the drawing dies are not likely to wear, so that large lengths of metal tubing can be produced in a continuous production process.

BRIEF DESCRIPTION OF THE DRAWINGS

The invention will now be described in greater detail, by way of example, with the aid of the schematic embodiments depicted in FIGS. 1 through 3.

DETAILED DESCRIPTION OF THE INVENTION

The invention will now be described in greater detail, by way of example, with the aid of the schematic embodiments depicted in FIGS. 1 and 2.

Figure 1:
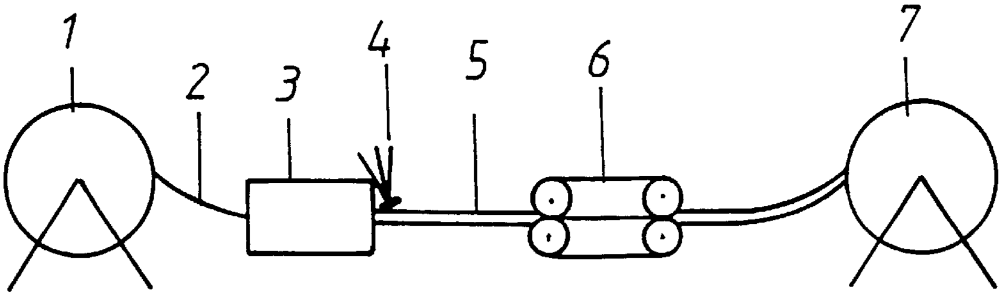

FIG. 1 schematically depicts the process sequence. A metal strip 2 with a wall thickness of less than 0.15 mm is pulled from a supply reel 1 and, in a tube shaping device 3, is gradually formed into a slit tube, the longitudinal edges of which are welded by means of a laser welding device 4. The welded tube 5 is gripped by a clamping jaw pull-off device 6 and delivered to a supply drum 7.

The welded tube 5 has, for instance, the following dimensions:

| | |
|---|---|
| outside diameter D = | 2.0 mm |
| wall thickness s = | 0.075 mm |

To be able to produce a tube with these dimensions, the tube shaping process must meet very exacting requirements.

Figure 2:
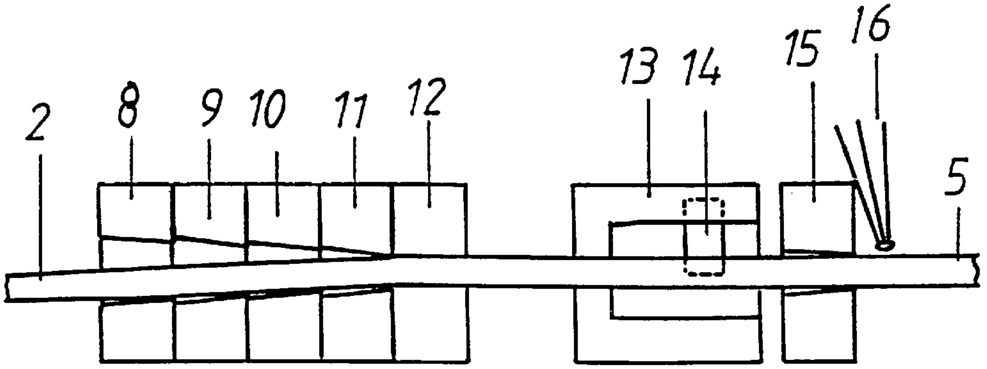

FIG. 2 shows a lateral cross-section of the tube shaping device 3.

With the aid of a conventional roller tool, the metal strip 2 is initially provided with a curvature only along the strip edges. The radius of this curvature approximately corresponds to the radius of the finished tube.

Figure 3:
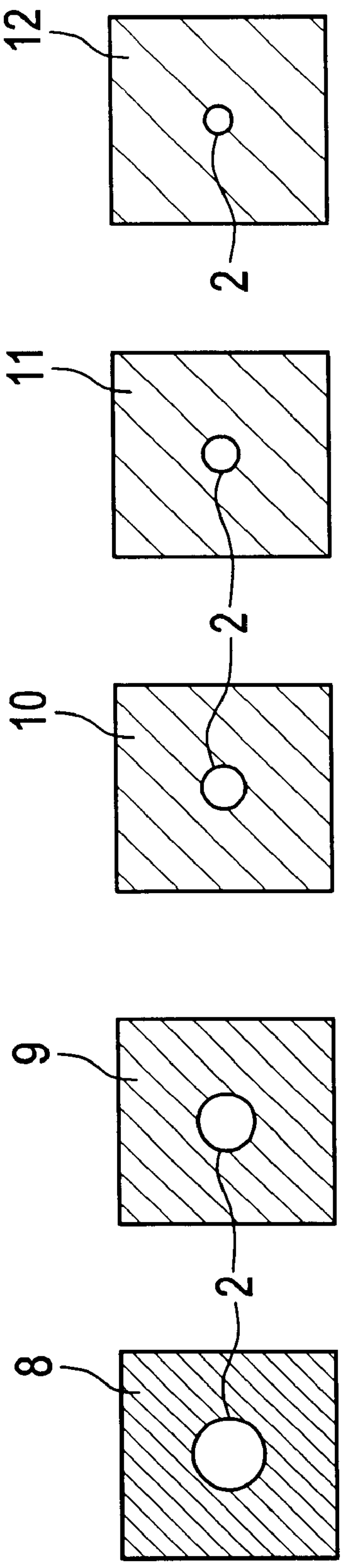

The pre-shaped metal strip is then gradually formed into a tube with an open slit by means of a plurality of drawing dies 8, 9, 10 and 11, which are arranged one behind the other and each of which has a conical opening. Particularly advantageously, the drawing dies are made of diamond. The aperture angle of the drawing dies 8, 9, 10 and 11 is about 4°. A detailed view of the drawing dies 8, 9, 10, 11 is shown in FIG. 3.

A tube guiding device 12 with a cylindrical bore is arranged behind the last drawing die 11.

In an enclosure 13 disposed behind the tube guiding device 12, a so-called sword 14 is provided, which protrudes through the longitudinal slit of the tube into the tube interior and contacts the longitudinal edges of the tube. This provides precise guidance of the strip edges to prevent any problems during welding. Behind enclosure 13, there is a last drawing die 15 whose conically extending opening at its narrowest point, i.e., at the exit end, brings together the strip edges, which are then welded with the aid of the laser welding device 16. Drawing die 15 is also made of diamond.

What is claimed is:

1. Process for producing longitudinally welded tubes in which a metal strip continuously pulled from a supply is gradually formed into a slit tube and the longitudinal slit of the slit tube is welded, characterized in that the metal strip (2) is pulled from the supply directly through a plurality of drawing dies (8, 9, 10, 11) arranged one behind the other with decreasing diameter bores in a production direction, the metal strip (2) is increasingly bent in circumferential direction in each of the bores of the drawing dies (8, 9, 10, 11), and in a last forming step (15) the slit tube is closed immediately in front of the welding point.

2. Process as claimed in claim 1, characterized in that the metal strip (2) is pulled through drawing dies (8, 9, 10, 11, 15) made of hard metal, ceramic or diamond.

3. Process as claimed in claim 1, characterized in that the metal strip (2), prior to entering the first drawing die (8), is shaped along its strip edges such that the radius of curvature along the deformed strip edges approximately corresponds to the radius of curvature of the finished tube (5).

4. Process as claimed in claim 1, characterized in that in front of the last drawing die (15) the strip edges are guided in such a way that said strip edges are precisely positioned at the welding point.

5. Process as claimed in claim 1, characterized in that a laser (16) is used for welding.

6. Apparatus for producing longitudinally welded metal tubes comprising:

a shaping device for shaping a metal strip into a slit tube in several steps; and a welding device for closing the longitudinal slit of the tube, wherein the shaping device (3) comprises a plurality of drawing dies (8, 9, 10, 11) arranged one behind the other, which incrementally bend the metal strip (2) into a slit tube, wherein the plurality of dies each contains a bore therein for receiving the metal strip.

7. Apparatus for producing longitudinally welded metal tubes comprising:

a shaping device for shaping a metal strip into a slit tube in several steps; and a welding device for closing the longitudinal slit of the tube, wherein the shaping device (3) comprises a plurality of drawing dies (8, 9, 10, 11) arranged one behind the other, which incrementally bend the metal strip (2) into a slit tube, wherein the plurality of dies each contains a bore therein for receiving the metal strip, characterized in that in front of the last drawing die (15) a sword (14) is provided, which protrudes into the interior of the slit tube and guides the strip edges.

8. Apparatus as claimed in claim 6, characterized in that the drawing dies (8, 9, 10, 11, 15) are made of hard metal.

9. Apparatus as claimed in claim 6, characterized in that the drawing dies (8, 9, 10, 11, 15) are made of ceramic.

10. Apparatus as claimed in claim 6, characterized in that the drawing dies (8, 9, 10, 11, 15) are made of diamond.

11. Apparatus as claimed in claim 6, characterized in that, in front of the first drawing die (8), a roller tool is arranged, which grips only the strip edges and shapes them in such a way that the curvature of the strip edge areas is equal to the curvature of the finished welded tube.

12. Apparatus as claimed in claim 6, characterized in that a laser welding device (16) is arranged behind the last drawing die (15).

13. Apparatus as claimed in claim 6, characterized in that the bore of the drawing dies (8, 9, 10, 11, 15) extends conically in a decreasing tapered shape.

14. Apparatus as claimed in claim 6, characterized in that the shaping device (3) comprises a first group of a plurality of tightly spaced drawing dies (8, 9, 10, 11) arranged one behind the other, and an additional drawing die (15) is arranged behind them and spaced apart therefrom in production direction.

15. Apparatus as claimed in claim 14, characterized in that an entry opening of each successive drawing die of the first group has an entry opening with a diameter greater than an exit opening of the drawing die before it.

* * * * *